March 11, 1952     D. W. SAWYER     2,588,416
STEREOSCOPE ATTACHMENT FOR PRINT LIFTING
Filed April 28, 1949

Inventor
DONALD W. SAWYER
By F. Schmitt
Attorney

Patented Mar. 11, 1952

2,588,416

UNITED STATES PATENT OFFICE 2,588,416

STEREOSCOPE ATTACHMENT FOR PRINT LIFTING

Donald W. Sawyer, Rochester, N. Y.

Application April 28, 1949, Serial No. 90,211

7 Claims. (Cl. 88—29)

(Granted under the act of March 3, 1883, as amended April 30, 1928; 370 O. G. 757)

This invention relates to a device for facilitating the stereoscopic study of overlapped prints or maps. The present invention is especially concerned with interpretation and annotation of data revealed by a succession of aerial photographs that must be matched visually to afford a complete picture.

It is the usual procedure in the field of aerial photography to take photographs of the ground area in such sequence that they overlap each other about sixty per cent. It follows that, when prints from the photographs are laid approximately edge to edge under a stereoscope for observation, there is more photographed area than can be viewed through the instrument. That is to say the imperfectly matched or overlapped portions cover too much area for quick and accurate obesrvation.

In past interpretation of aerial photographs, particularly for use in the field, there has been provided a folding or "pocket" stereoscope, which has been annoying and inefficient when viewing overlapping stereo pairs of prints. If more than twenty to thirty per cent of the overlap area is to be studied it is necessary to lift a considerable portion of one of the prints out of the way, and this is difficult to do manually. Moreover, the manually lifted portion may obstruct the operator's view of the other portions. The photographs also are easily cracked or otherwise damaged by manipulation with the fingers.

It is the primary object of the present invention to provide a device that may be attached to or that may form a permanent part of a stereoscope to substantially automatically perform some difficult functions heretofore performed by hand while simultaneously affording better conditions of map observation.

It is another important object to provide a device of the class mentioned above that may be detachably and/or foldably connected to a folding or pocket type stereoscope that is shiftable horizontally relative to a pair of prints that are laid down in overlapped relationship for observation.

Figure 1:
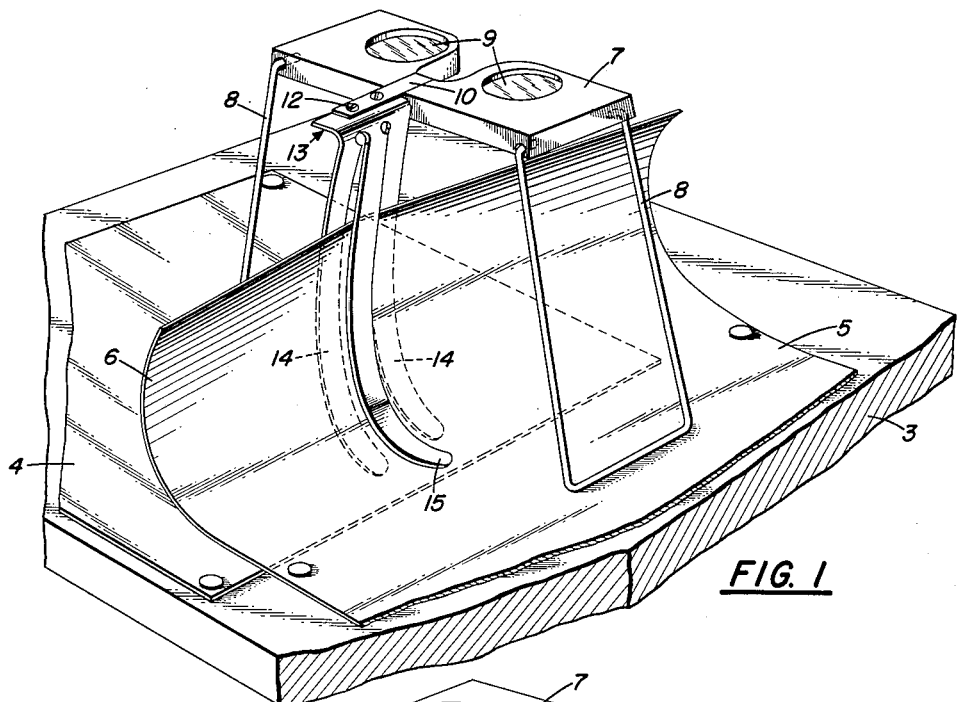
Figure 2:
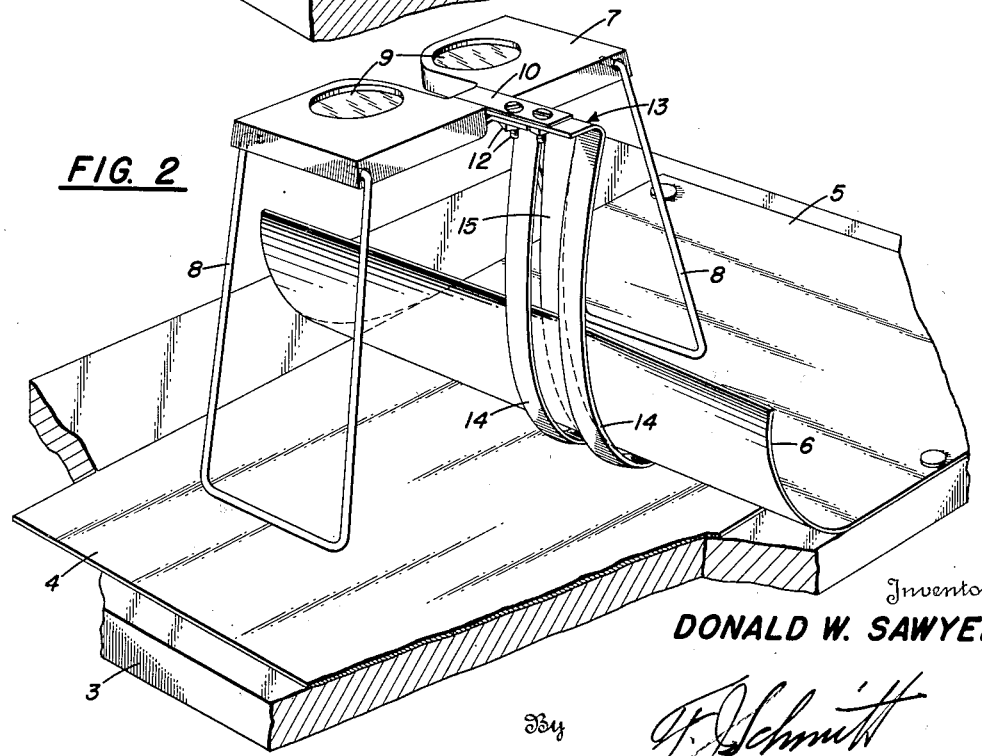

These and further objects of the invention should clearly appear from a study of the following detailed description when taken in conjunction with the accompanying drawing, wherein:

Fig. 1 is a perspective view of a preferred embodiment showing the manner in which it picks up and holds an edge of one of a pair of overlapped prints: and Fig. 2 is another perspective view of the same device taken at another angle to afford a complete and clarified disclosure.

With continued reference to the drawing, there is shown a suitable board or platform 3 upon which there is tacked or taped a pair of prints 4 and 5. These prints normally consist of mapped areas photographed vertically from the air, and of course such photographs necessarily contain duplicated areas that must be overlapped when laid down for inspection as a complete map.

Ordinarily, there will be an overlap of approximately fifty to sixty per cent, but as the stereoscope can be used to view only about thirty per cent with adequate clarity the map portions must be relatively shifted, as by turning the edge portion 6 of the print 5 upwardly to bring their matched borders into rough coincidence. This previously has been done by hand in a cumbersome manner. The present invention affords a remedial means for eliminating the problem.

The sterescope shown in Figs. 1 and 2 is of conventional design, comprising a platform 7 supported by U-shaped foldable legs 8 and carrying a pair of lenses 9. Everything thus far described is known and conventional.

A bracket 10 is rigidly secured to the platform 7 by screw and nut assemblies 12, the latter also serving to mount a print holding and lifting device 13. It should be understood that this bracket may be mounted in other ways and that, if desired, it may be made adjustable to permit folding of the device 13 in much the same manner that the legs 8 are foldable.

The device 13 of this invention comprises, preferably, a unitary structure consisting of a pair of vertically suspended fingers 14 separated by a third finger 15, formed by slotting a curved sheet of metal or other material and then bending the third finger 15 forwardly into slightly offset relation to the fingers 14. The curve is smooth and of such degree that the portion 6 of one of the prints may slide into and within the guide or "pocket" thus formed without damage to the print. The fingers are approximately of the same vertical length as the unfolded legs 8 of the stereoscope so that all of them rest upon or work along the top surface of the board 3.

In the preferred and illustrated arrangement there are three fingers but it should be understood that the number may be varied. For examples, only two fingers might suffice if properly offset, and the finger 15 might be duplicated in the disclosed device. It is essential only that the group of fingers serve to scoop up a portion of one of the map sections and hold it so that the matched areas may be stereoptically viewed and without interposing the lifted portion directly in the line of stereoscopic vision.

The operational use of the device should be obvious from the foregoing description.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. An instrument including a stereoscope of the class described, comprising a support having legs movable over a horizontal surface, and a plurality of curved fingers suspended from said support in offset relation to each other, said fingers being of approximately the same length as said legs.

2. In combination with a stereoscope designed for map viewing, a set of fingers secured thereto, said fingers being curved and separated to form a guiding scoop for lifting an edge of a map section.

3. The device as set forth in claim 2, said stereoscope having off-set supports and said fingers being secured to said stereoscope between said supports.

4. The device as set forth in claim 2, said stereoscope having legs adapted to rest on flat stereoscopic view material with leg ends lying in a plane normally parallel to said view material and said fingers having ends lying approximately in the plane of the leg ends.

5. The device as set forth in claim 4, with at least one of said curved fingers ending in a flattened section lying approximately in the plane of the leg ends.

6. A stereoscope for inspecting sheet view material lying in an approximately level view plane, comprising spaced coplanar lenses, a frame for said lenses, legs secured to said frame for holding the lens plane displaced from and approximately parallel to the view plane, and a device secured to said frame for holding an edge of sheet view material, said device including a cross support mounted on said frame between said lenses transversely to the line joining the lens centers, and sheet gripping members suspended from said cross support for holding the sheet edge transversely between said lenses.

7. The instrument as defined in claim 6 with the sheet gripping members comprising plural open-ended fingers displaced transversely along said cross support and lying in at least two closely spaced transverse planes.

DONALD W. SAWYER.

REFERENCES CITED

The following references are of record in the file of this patent:

UNITED STATES PATENTS

| Number | Name | Date |
|---|---|---|
| 319,359 | Van Gieson | June 2, 1885 |
| 375,912 | Adt | Jan. 3, 1888 |
| 502,450 | Wagner | Aug. 1, 1893 |
| 1,392,327 | Hattersley | Oct. 4, 1921 |
| 1,711,977 | Underwood | May 7, 1929 |
| 1,762,286 | Wood | June 10, 1930 |
| 1,950,206 | Allen | Mar. 6, 1934 |
| 2,366,228 | Abrams et al. | Jan. 2, 1945 |